US012030072B2

(12) United States Patent
McAfee

(10) Patent No.: US 12,030,072 B2
(45) Date of Patent: Jul. 9, 2024

(54) PRESSURE REGULATION DEVICE AND METHOD FOR IRRIGATION SPRINKLERS

(71) Applicant: Rain Bird Corporation, Azusa, CA (US)

(72) Inventor: Michael A. McAfee, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 0 days.

(21) Appl. No.: 17/526,214

(22) Filed: Nov. 15, 2021

(65) Prior Publication Data

US 2022/0152642 A1 May 19, 2022

Related U.S. Application Data

(60) Provisional application No. 63/114,320, filed on Nov. 16, 2020.

(51) Int. Cl.
*B05B 12/08* (2006.01)

(52) U.S. Cl.
CPC .................................. *B05B 12/088* (2013.01)

(58) Field of Classification Search
CPC ........ B05B 12/088; B05B 15/40; B05B 15/74
USPC .............. 251/145, 120; 137/525; 239/533.13
See application file for complete search history.

(56) References Cited

U.S. PATENT DOCUMENTS

| | | | |
|---|---|---|---|
| 894,898 | A | 8/1908 | Owen |
| 1,123,746 | A | 1/1915 | Jewell |
| 1,203,542 | A | 10/1916 | Hawley |
| 1,726,490 | A | 8/1929 | Irving |
| 1,758,119 | A | 5/1930 | Le Moon |
| 1,931,761 | A | 10/1933 | Hertel |
| 2,075,589 | A | 3/1937 | Munz |
| 2,187,549 | A | 1/1940 | Thompson |
| 2,268,855 | A | 1/1942 | Brooks |
| 2,446,918 | A | 8/1948 | Goddard |
| 2,591,282 | A | 4/1952 | Nelson |
| 2,607,623 | A | 8/1952 | Lippert |
| 2,693,816 | A | 11/1954 | Hoelzer |
| 2,796,293 | A | 6/1957 | Becker |
| 2,810,607 | A | 10/1957 | Hruby, Jr. |
| 3,107,056 | A | 10/1963 | Hunter |
| 3,263,930 | A | 8/1966 | Anton |
| 3,323,725 | A | 6/1967 | Hruby, Jr. |
| 3,334,817 | A | 8/1967 | Miller |

(Continued)

OTHER PUBLICATIONS

U.S. Appl. No. 62/907,289, filed Sep. 27, 2019 for Irrigation Sprinkler Service Valve, 27 pages.

(Continued)

*Primary Examiner* — Qingzhang Zhou
(74) *Attorney, Agent, or Firm* — Fitch, Even, Tabin & Flannery, LLP

(57) ABSTRACT

A pressure regulation device and method are provided for reducing fluid flow. The device may be disposed within a stem of a sprinkler, within the nozzle filter or other appropriate location within the sprinkler. The device may be a single piece structure that is formed from a thermoplastic elastomer material. The device has a body with slots that form sidewalls, which are configured to move relative to each other and deflect relative to a neutral state. The amount of movement relative to each other from the neutral state causes a reduction in pressure of the fluid exiting the regulator.

19 Claims, 12 Drawing Sheets

(56) References Cited

U.S. PATENT DOCUMENTS

| | | | | |
|---|---|---|---|---|
| 3,404,840 | A | 10/1968 | Trickey | |
| 3,404,841 | A | 10/1968 | Brittain | |
| 3,454,225 | A | 7/1969 | Hunter | |
| 3,521,822 | A | 7/1970 | Friedmann | |
| 3,523,647 | A | 8/1970 | Radecki | |
| 3,567,125 | A | 3/1971 | Houghton | |
| 3,655,132 | A | 4/1972 | Rosic | |
| 3,734,456 | A | 5/1973 | Varrin | |
| 3,782,638 | A | 1/1974 | Bumpstead | |
| 3,870,236 | A | 3/1975 | Sahagun-Barragan | |
| 3,873,030 | A | 3/1975 | Barragan | |
| 3,896,999 | A | 7/1975 | Barragan | |
| 3,921,912 | A | 11/1975 | Hayes | |
| 3,934,820 | A | 1/1976 | Phaup | |
| 3,948,285 | A | 4/1976 | Flynn | |
| 4,077,570 | A * | 3/1978 | Harmony | B05B 1/323 239/533.13 |
| 4,091,997 | A | 5/1978 | Ridgway | |
| 4,105,050 | A | 8/1978 | Hendrickson | |
| 4,105,186 | A | 8/1978 | Eby | |
| 4,132,364 | A * | 1/1979 | Harmony | A01G 25/023 239/533.13 |
| 4,189,099 | A | 2/1980 | Bruninga | |
| 4,295,631 | A | 10/1981 | Allen | |
| 4,314,582 | A | 2/1982 | Drori | |
| 4,417,691 | A | 11/1983 | Lockwood | |
| 4,492,210 | A | 1/1985 | Hunt | |
| 4,498,626 | A | 2/1985 | Pitchford | |
| 4,562,962 | A | 1/1986 | Hartman | |
| 4,592,390 | A * | 6/1986 | Boyd | F16K 17/24 138/44 |
| 4,624,412 | A | 11/1986 | Hunter | |
| 4,625,914 | A | 12/1986 | Sexton | |
| 4,634,052 | A | 1/1987 | Grizzle | |
| 4,650,118 | A | 3/1987 | Saarem | |
| 4,681,259 | A | 7/1987 | Troup | |
| 4,702,417 | A | 10/1987 | Hartley | |
| 4,708,291 | A | 11/1987 | Grundy | |
| 4,718,605 | A | 1/1988 | Hunter | |
| 4,736,889 | A | 4/1988 | Stephenson | |
| 4,773,595 | A | 9/1988 | Livne | |
| 4,784,325 | A | 11/1988 | Walker | |
| 4,787,558 | A | 11/1988 | Sexton | |
| 4,790,481 | A | 12/1988 | Ray | |
| 4,819,875 | A | 4/1989 | Beal | |
| 4,842,198 | A | 6/1989 | Chang | |
| 4,848,661 | A | 7/1989 | Palmer | |
| 4,867,378 | A | 9/1989 | Kah | |
| 4,867,379 | A | 9/1989 | Hunter | |
| 4,867,603 | A | 9/1989 | Chang | |
| 4,874,017 | A * | 10/1989 | Hendrickson | F15D 1/0005 239/533.13 |
| 4,880,167 | A | 11/1989 | Langa | |
| 4,892,252 | A | 1/1990 | Bruninga | |
| 4,898,332 | A | 2/1990 | Hunter | |
| 4,901,924 | A | 2/1990 | Kah | |
| 4,913,352 | A | 4/1990 | Witty | |
| 4,919,337 | A | 4/1990 | Van Leeuwen | |
| 4,925,098 | A | 5/1990 | Di Paola | |
| 4,955,542 | A | 9/1990 | Kah | |
| 4,967,961 | A | 11/1990 | Hunter | |
| 4,971,256 | A | 11/1990 | Malcolm | |
| 4,972,993 | A | 11/1990 | Van Leeuwen | |
| 5,009,368 | A | 4/1991 | Streck | |
| 5,031,833 | A | 7/1991 | Alkalay | |
| 5,048,757 | A | 9/1991 | Van Leeuwen | |
| 5,050,800 | A | 9/1991 | Lamar | |
| 5,052,621 | A | 10/1991 | Katzer | |
| 5,086,976 | A | 2/1992 | Sessions | |
| 5,098,021 | A | 3/1992 | Kah | |
| 5,115,977 | A | 5/1992 | Alkalay | |
| 5,148,990 | A | 9/1992 | Kah | |
| 5,148,991 | A | 9/1992 | Kah | |
| 5,163,622 | A | 11/1992 | Cohen | |
| 5,174,500 | A | 12/1992 | Yianilos | |
| 5,207,386 | A | 5/1993 | Mehoudar | |
| 5,213,303 | A | 5/1993 | Walker | |
| 5,257,646 | A | 11/1993 | Meyer | |
| 5,265,803 | A | 11/1993 | Thayer | |
| 5,288,023 | A | 2/1994 | Han | |
| 5,330,103 | A | 7/1994 | Eckstein | |
| 5,335,857 | A | 8/1994 | Hagon | |
| 5,372,306 | A | 12/1994 | Yianilos | |
| 5,383,600 | A | 1/1995 | Verbera | |
| 5,400,973 | A | 3/1995 | Cohen | |
| 5,417,370 | A | 5/1995 | Kah | |
| 5,473,961 | A | 12/1995 | Jackson | |
| 5,524,824 | A | 6/1996 | Frimmer | |
| 5,556,036 | A | 9/1996 | Chase | |
| 5,609,303 | A | 3/1997 | Cohen | |
| 5,620,143 | A | 4/1997 | Delmer | |
| 5,641,122 | A | 6/1997 | Alkalai | |
| 5,647,541 | A | 7/1997 | Nelson | |
| 5,653,390 | A | 8/1997 | Kah | |
| 5,673,855 | A | 10/1997 | Nguyen | |
| 5,676,315 | A | 10/1997 | Han | |
| 5,685,486 | A | 11/1997 | Spenser | |
| 5,695,123 | A | 12/1997 | Van Le | |
| 5,758,682 | A | 6/1998 | Cain | |
| 5,758,827 | A | 6/1998 | Van Le | |
| 5,762,270 | A | 6/1998 | Kearby | |
| 5,779,148 | A | 7/1998 | Saarem | |
| 5,785,246 | A | 7/1998 | King | |
| 5,823,440 | A | 10/1998 | Clark | |
| 5,829,685 | A | 11/1998 | Cohen | |
| 5,829,686 | A | 11/1998 | Cohen | |
| 5,871,156 | A | 2/1999 | Lawson | |
| 5,875,813 | A | 3/1999 | Cook | |
| 5,875,815 | A | 3/1999 | Ungerecht | |
| 5,881,757 | A | 3/1999 | Kuster | |
| 5,899,386 | A | 5/1999 | Miyasato | |
| 5,938,122 | A | 8/1999 | Heren | |
| 5,957,391 | A | 9/1999 | Defrank | |
| 5,975,430 | A | 11/1999 | Larsen | |
| 5,992,760 | A | 11/1999 | Kearby | |
| 6,000,632 | A | 12/1999 | Wallace | |
| 6,015,102 | A | 1/2000 | Daigle | |
| 6,029,907 | A | 2/2000 | McKenzie | |
| 6,039,268 | A | 3/2000 | Grundy | |
| 6,042,021 | A | 3/2000 | Clark | |
| 6,050,502 | A | 4/2000 | Clark | |
| 6,079,437 | A | 6/2000 | Beutler | |
| 6,085,995 | A | 7/2000 | Kah | |
| 6,109,545 | A | 8/2000 | Kah | |
| 6,155,493 | A | 12/2000 | Kearby | |
| 6,158,675 | A | 12/2000 | Ogi | |
| 6,178,982 | B1 | 1/2001 | Longstreth | |
| 6,178,993 | B1 | 1/2001 | Oberdorfer | |
| 6,179,221 | B1 | 1/2001 | Goldberg | |
| 6,199,584 | B1 | 3/2001 | Brown | |
| 6,209,801 | B1 | 4/2001 | Kearby | |
| 6,213,408 | B1 | 4/2001 | Shekalim | |
| 6,227,455 | B1 | 5/2001 | Scott | |
| 6,237,862 | B1 | 5/2001 | Kah | |
| 6,241,158 | B1 | 6/2001 | Clark | |
| 6,244,521 | B1 | 6/2001 | Sesser | |
| 6,260,575 | B1 | 7/2001 | Brown | |
| 6,263,911 | B1 | 7/2001 | Brown | |
| 6,263,912 | B1 | 7/2001 | Brown | |
| 6,264,117 | B1 | 7/2001 | Roman | |
| 6,336,597 | B1 | 1/2002 | Kah | |
| 6,364,217 | B1 | 4/2002 | Lockwood | |
| 6,367,501 | B2 | 4/2002 | Svehaug | |
| 6,371,390 | B1 | 4/2002 | Cohen | |
| 6,382,530 | B1 | 5/2002 | Perkins | |
| D458,554 | S | 6/2002 | Jolly | |
| 6,457,696 | B1 | 10/2002 | Hirota | |
| 6,478,237 | B2 | 11/2002 | Kearby | |
| 6,491,235 | B1 | 12/2002 | Scott | |
| 6,494,384 | B1 | 12/2002 | Meyer | |
| 6,499,672 | B1 | 12/2002 | Sesser | |
| 6,568,607 | B2 | 5/2003 | Boswell | |
| 6,568,608 | B2 | 5/2003 | Sirkin | |
| 6,581,854 | B2 | 6/2003 | Eckstein | |

(56) References Cited

U.S. PATENT DOCUMENTS

| | | | |
|---|---|---|---|
| 6,601,781 | B2 | 8/2003 | Kah |
| 6,607,147 | B2 | 8/2003 | Schneider |
| 6,651,905 | B2 | 11/2003 | Sesser |
| 6,695,223 | B2 | 2/2004 | Beutler |
| 6,732,946 | B2 | 5/2004 | Veazie |
| 6,732,950 | B2 | 5/2004 | Ingham, Jr. |
| 6,732,952 | B2 | 5/2004 | Kah |
| 6,736,332 | B2 | 5/2004 | Sesser |
| 6,736,337 | B2 | 5/2004 | Vildibill |
| 6,799,732 | B2 | 10/2004 | Sirkin |
| 6,802,458 | B2 | 10/2004 | Gregory |
| 6,814,304 | B2 | 11/2004 | Onofrio |
| 6,814,305 | B2 | 11/2004 | Townsend |
| 6,817,543 | B2 | 11/2004 | Clark |
| 6,817,548 | B2 | 11/2004 | Krauth |
| 6,827,291 | B2 | 12/2004 | Townsend |
| 6,834,816 | B2 | 12/2004 | Kah, Jr. |
| 6,840,460 | B2 | 1/2005 | Clark |
| 6,848,632 | B2 | 2/2005 | Clark |
| 6,854,664 | B2 | 2/2005 | Smith |
| 6,869,026 | B2 | 3/2005 | McKenzie |
| 6,883,727 | B2 | 4/2005 | De Los Santos |
| 6,886,761 | B2 | 5/2005 | Cohen |
| 6,893,002 | B2 | 5/2005 | Brice |
| 6,921,029 | B2 | 7/2005 | Lockwood |
| 6,942,164 | B2 | 9/2005 | Walker |
| 6,945,471 | B2 | 9/2005 | McKenzie |
| 6,997,393 | B1 | 2/2006 | Angold |
| 7,017,831 | B2 | 3/2006 | Santiago |
| 7,028,920 | B2 | 4/2006 | Hekman |
| 7,032,836 | B2 | 4/2006 | Sesser |
| 7,040,553 | B2 | 5/2006 | Clark |
| 7,044,403 | B2 | 5/2006 | Kah |
| 7,051,951 | B2 | 5/2006 | Magi |
| 7,143,692 | B2 | 12/2006 | Schmitt |
| 7,143,962 | B2 | 12/2006 | Kah, Jr. |
| 7,152,814 | B1 | 12/2006 | Schapper |
| 7,159,795 | B2 | 1/2007 | Sesser |
| 7,168,444 | B2 | 1/2007 | Sesser |
| 7,168,632 | B2 | 1/2007 | Kates |
| 7,168,634 | B2 | 1/2007 | Onofrio |
| 7,191,958 | B1 | 3/2007 | Wang |
| 7,226,003 | B2 | 6/2007 | Kah |
| 7,232,081 | B2 | 6/2007 | Kah |
| 7,234,651 | B2 | 6/2007 | Mousavi |
| 7,270,280 | B2 | 9/2007 | Belford |
| 7,287,711 | B2 | 10/2007 | Crooks |
| 7,287,712 | B2 | 10/2007 | Kah |
| 7,293,721 | B2 | 11/2007 | Roberts |
| 7,303,153 | B2 | 12/2007 | Han |
| 7,322,533 | B2 | 1/2008 | Grizzle |
| 7,337,988 | B2 | 3/2008 | McCormick |
| 7,370,667 | B2 | 5/2008 | Sesser |
| 7,372,956 | B1 | 5/2008 | Kikinis |
| RE40,440 | E | 7/2008 | Sesser |
| 7,392,956 | B2 | 7/2008 | McKenzie |
| 7,401,622 | B2 | 7/2008 | Ungerecht |
| 7,404,525 | B2 | 7/2008 | Santiago |
| 7,429,005 | B2 | 9/2008 | Schapper |
| 7,438,083 | B2 | 10/2008 | Feith |
| 7,478,526 | B2 | 1/2009 | McAfee |
| 7,478,646 | B2 | 1/2009 | Borrenpohl |
| 7,500,619 | B2 | 3/2009 | Lockwood |
| 7,597,273 | B2 | 10/2009 | McAfee |
| 7,611,077 | B2 | 11/2009 | Sesser |
| 7,621,464 | B2 | 11/2009 | Smith |
| 7,621,467 | B1 | 11/2009 | Garcia |
| 7,628,910 | B2 | 12/2009 | Lockwood |
| 7,631,813 | B1 | 12/2009 | Lichte |
| 7,644,870 | B2 | 1/2010 | Alexander |
| 7,677,469 | B1 | 3/2010 | Clark |
| 7,681,807 | B2 | 3/2010 | Gregory |
| 7,686,235 | B2 | 3/2010 | Roberts |
| 7,686,236 | B2 | 3/2010 | Alexander |
| 7,703,706 | B2 | 4/2010 | Walker |
| 7,793,868 | B2 | 9/2010 | Kah |
| 7,806,382 | B1 | 10/2010 | Palumbo |
| 7,828,229 | B2 | 11/2010 | Kah |
| 7,828,230 | B1 | 11/2010 | Anuskiewicz |
| 7,834,816 | B2 | 11/2010 | Marino |
| 7,841,547 | B2 | 11/2010 | Kah |
| 7,850,094 | B2 | 12/2010 | Richmond |
| 7,854,399 | B2 | 12/2010 | Sirkin |
| 7,861,948 | B1 | 1/2011 | Crooks |
| 7,896,021 | B2 | 3/2011 | Claude |
| 7,971,804 | B2 | 7/2011 | Roberts |
| 8,006,919 | B2 | 8/2011 | Renquist |
| 8,047,456 | B2 | 11/2011 | Kah |
| 8,056,829 | B2 | 11/2011 | Gregory |
| 8,136,743 | B2 | 3/2012 | Kah |
| 8,187,471 | B2 | 5/2012 | Lockwood |
| 8,272,578 | B1 | 9/2012 | Clark |
| 8,297,533 | B2 | 10/2012 | Dunn |
| 8,313,043 | B1 | 11/2012 | Crooks |
| 8,408,228 | B1 | 4/2013 | Jimenez |
| 8,408,482 | B2 | 4/2013 | Gregory |
| 8,444,063 | B2 | 5/2013 | Lichte |
| 8,474,733 | B1 | 7/2013 | Clark |
| 8,540,171 | B2 | 9/2013 | Renquist |
| 8,596,559 | B2 | 12/2013 | Kah, Jr. |
| 8,628,027 | B2 | 1/2014 | Kah |
| 8,636,229 | B1 | 1/2014 | Clark |
| 8,636,230 | B1 | 1/2014 | Clark |
| 8,636,233 | B2 | 1/2014 | Clark |
| 8,714,186 | B2 | 5/2014 | Ungerecht |
| 8,727,238 | B1 | 5/2014 | Clark |
| 8,740,177 | B2 | 6/2014 | Walker |
| 8,746,591 | B2 | 6/2014 | Lichte |
| 8,794,542 | B1 | 8/2014 | Hunter |
| 8,833,672 | B2 | 9/2014 | Skripkar |
| 8,857,742 | B2 | 10/2014 | Onofrio |
| 8,893,986 | B2 | 11/2014 | Kah, Jr |
| 8,939,384 | B1 | 1/2015 | Anuskiewicz |
| 8,950,789 | B2 | 2/2015 | Jahan |
| 8,955,767 | B1 | 2/2015 | Clark |
| 8,991,725 | B2 | 3/2015 | Kah |
| 8,991,726 | B2 | 3/2015 | Kah, Jr |
| 8,991,730 | B2 | 3/2015 | Kah, Jr |
| 8,998,107 | B2 | 4/2015 | Sesser |
| 9,038,665 | B2 | 5/2015 | Cheng |
| 9,038,924 | B2 | 5/2015 | Lo |
| 9,120,111 | B2 | 9/2015 | Nations |
| 9,138,767 | B2 | 9/2015 | Franks |
| 9,138,768 | B2 | 9/2015 | Jahan |
| 9,156,043 | B2 | 10/2015 | Walker |
| 9,169,944 | B1 | 10/2015 | Dunn |
| 9,192,956 | B2 | 11/2015 | Kah, Jr. |
| 9,205,435 | B1 | 12/2015 | Clark |
| 9,242,255 | B2 | 1/2016 | Lichte |
| 9,296,004 | B1 | 3/2016 | Clark |
| 9,341,270 | B2 | 5/2016 | Boretti |
| 9,348,344 | B2 | 5/2016 | Le |
| 9,387,494 | B2 | 7/2016 | Sesser |
| 9,440,250 | B2 | 9/2016 | Walker |
| 9,446,421 | B1 | 9/2016 | Anuskiewicz |
| 9,459,631 | B2 | 10/2016 | Lawyer |
| 9,511,387 | B2 | 12/2016 | Keren |
| 9,573,145 | B2 | 2/2017 | Kah, Jr. |
| 9,578,817 | B2 | 2/2017 | Dunn |
| 9,616,437 | B2 | 4/2017 | Onofrio |
| 9,662,668 | B1 | 5/2017 | Clark |
| 9,776,195 | B2 | 10/2017 | Russell |
| 9,851,037 | B2 | 12/2017 | Whitaker |
| 9,937,513 | B2 | 4/2018 | Kah, III |
| 9,981,276 | B2 | 5/2018 | Kah, Jr. |
| 9,987,639 | B2 | 6/2018 | Russell |
| 10,029,265 | B2 | 7/2018 | Bell |
| 10,058,042 | B2 | 8/2018 | Crist |
| 10,099,231 | B2 | 10/2018 | Clark |
| 10,213,802 | B2 | 2/2019 | Kah, Jr. |
| 10,220,405 | B2 | 3/2019 | Kah, Jr. |
| 10,232,387 | B2 | 3/2019 | Kah, Jr. |
| 10,267,248 | B2 | 4/2019 | Kimoto |
| 10,293,359 | B1 | 5/2019 | Polen |

(56) References Cited

U.S. PATENT DOCUMENTS

| | | | |
|---|---|---|---|
| 10,464,083 | B2 | 11/2019 | Onofrio |
| 10,556,248 | B2 | 2/2020 | Wright, III |
| 10,559,949 | B2 | 2/2020 | Paul |
| 10,717,093 | B2 | 7/2020 | Bell |
| 10,744,522 | B2 | 8/2020 | Wu |
| 10,786,823 | B2 | 9/2020 | Clark |
| 10,828,651 | B2 | 11/2020 | Kah, Jr. |
| 10,850,295 | B2 | 12/2020 | Wildt |
| RE48,397 | E | 1/2021 | Kah, Jr. |
| 10,967,391 | B2 | 4/2021 | Kah, Jr. |
| 11,040,359 | B2 | 6/2021 | Simmons |
| 11,090,675 | B2 | 8/2021 | Renquist |
| 11,103,890 | B1 | 8/2021 | Morris |
| 11,110,477 | B2 | 9/2021 | Luo |
| 11,126,208 | B2 | 9/2021 | Nelson |
| 11,406,999 | B2 | 8/2022 | Belongia |
| 11,408,515 | B2 | 8/2022 | Greenwood |
| 11,478,804 | B2 | 10/2022 | Kah, Jr. |
| 11,511,289 | B2 | 11/2022 | Geerligs |
| 11,612,904 | B2 | 3/2023 | Wildt |
| 11,660,621 | B2 | 5/2023 | Walker |
| 11,701,677 | B2 | 7/2023 | Chou |
| 11,703,889 | B2 | 7/2023 | Belford |
| 11,717,838 | B2 | 8/2023 | Drechsel |
| 11,890,632 | B1 | 2/2024 | Morris |
| 2002/0023972 | A1 | 2/2002 | Kah |
| 2002/0104902 | A1 | 8/2002 | Eckstein |
| 2002/0104903 | A1 | 8/2002 | Eckstein |
| 2002/0130202 | A1 | 9/2002 | Kah |
| 2002/0158145 | A1 | 10/2002 | Schneider |
| 2003/0006306 | A1 | 1/2003 | Clark |
| 2003/0006307 | A1 | 1/2003 | Clark |
| 2003/0155433 | A1 | 8/2003 | Gregory |
| 2003/0213856 | A1 | 11/2003 | Sirkin |
| 2003/0218078 | A1 | 11/2003 | Veazie |
| 2004/0050958 | A1 | 3/2004 | McKenzie |
| 2005/0011554 | A1 | 1/2005 | Davila |
| 2005/0133619 | A1 | 6/2005 | Clark |
| 2005/0194464 | A1 | 9/2005 | Bruninga |
| 2006/0049275 | A1 | 3/2006 | Santiago |
| 2006/0086833 | A1 | 4/2006 | Roberts |
| 2006/0186228 | A1 | 8/2006 | Belford |
| 2006/0273196 | A1 | 12/2006 | Crooks |
| 2007/0119974 | A1 | 5/2007 | Johnson |
| 2007/0119975 | A1 | 5/2007 | Hunnicutt |
| 2007/0119978 | A1 | 5/2007 | Wang |
| 2007/0138323 | A1 | 6/2007 | Lee |
| 2007/0194150 | A1 | 8/2007 | Ericksen |
| 2007/0235565 | A1 | 10/2007 | Kah |
| 2007/0262168 | A1 | 11/2007 | Ericksen |
| 2008/0054092 | A1 | 3/2008 | Alexander |
| 2008/0067266 | A1 | 3/2008 | Cohen |
| 2008/0087743 | A1 | 4/2008 | Govrin |
| 2008/0105768 | A1 | 5/2008 | Kertscher |
| 2008/0142618 | A1 | 6/2008 | Smith |
| 2008/0237374 | A1 | 10/2008 | Belford |
| 2008/0257982 | A1 | 10/2008 | Kah |
| 2008/0308650 | A1 | 12/2008 | Clark |
| 2009/0065606 | A1 | 3/2009 | Lee |
| 2009/0072048 | A1 | 3/2009 | Renquist |
| 2009/0159726 | A1 | 6/2009 | Thompson |
| 2009/0165879 | A1 | 7/2009 | Socolsky |
| 2009/0173804 | A1 | 7/2009 | Kah |
| 2009/0188988 | A1 | 7/2009 | Walker |
| 2009/0314377 | A1 | 12/2009 | Giuffre |
| 2010/0078508 | A1 | 4/2010 | South |
| 2010/0090024 | A1 | 4/2010 | Hunnicutt |
| 2010/0090036 | A1 | 4/2010 | Allen |
| 2010/0108787 | A1 | 5/2010 | Walker |
| 2010/0243762 | A1 | 9/2010 | Onofrio |
| 2010/0276512 | A1 | 11/2010 | Nies |
| 2010/0301135 | A1 | 12/2010 | Hunnicutt |
| 2010/0301142 | A1 | 12/2010 | Hunnicutt |
| 2010/0327083 | A1 | 12/2010 | Kah |
| 2011/0017842 | A1 | 1/2011 | Nations |
| 2011/0036933 | A1 | 2/2011 | Kah |
| 2011/0057048 | A1 | 3/2011 | McAfee |
| 2011/0084151 | A1 | 4/2011 | Dunn |
| 2014/0042250 | A1 | 2/2014 | Maksymec |
| 2014/0042251 | A1 | 2/2014 | Maksymec |
| 2014/0246513 | A1 | 9/2014 | Terrell |
| 2014/0263735 | A1 | 9/2014 | Nations |
| 2015/0083828 | A1 | 3/2015 | Maksymec |
| 2015/0351332 | A1 | 12/2015 | Janku |
| 2016/0243563 | A1 | 8/2016 | Maksymec |
| 2018/0015487 | A1 | 1/2018 | Russell |
| 2018/0250692 | A1 | 9/2018 | Kah, Jr. |
| 2019/0076858 | A1 | 3/2019 | Clark |
| 2019/0143360 | A1 | 5/2019 | Kah, Jr. |
| 2019/0143361 | A1 | 5/2019 | Kah, Jr. |
| 2020/0156099 | A1 | 5/2020 | Wright, III |
| 2021/0095778 | A1 | 4/2021 | Hansen |
| 2021/0162449 | A1 | 6/2021 | McAfee |
| 2021/0404572 | A1 | 12/2021 | Nelson |
| 2022/0022391 | A1 | 1/2022 | Gazit |
| 2022/0152642 | A1 | 5/2022 | McAfee |
| 2022/0297139 | A1 | 9/2022 | Bell |
| 2022/0297140 | A1 | 9/2022 | McAfee |
| 2022/0339656 | A1 | 10/2022 | Belongia |
| 2023/0088593 | A1 | 3/2023 | Batista Estévez |
| 2023/0089249 | A1 | 3/2023 | Bell |

OTHER PUBLICATIONS

USPTO; U.S. Appl. No. 16/948,605; Final Rejection mailed Jun. 20, 2023; (pp. 1-8).

USPTO; U.S. Appl. No. 16/948,605; Non-Final Rejection mailed Dec. 23, 2022; (pp. 1-7).

Utility U.S. Appl. No. 17/975,345, filed Oct. 27, 2022 for Multi-Mode Rotor Sprinkler Apparatus and Method, 50 pages.

USPTO; U.S. Appl. No. 16/948,605; Notice of Allowance and Fees Due (PTOL-85) mailed Sep. 20, 2023; (pp. 1-7).

USPTO; U.S. Appl. No. 16/948,605; Notice of Allowance and Fees Due (PTOL-85) mailed Jan. 5, 2024; (pp. 1-7).

* cited by examiner

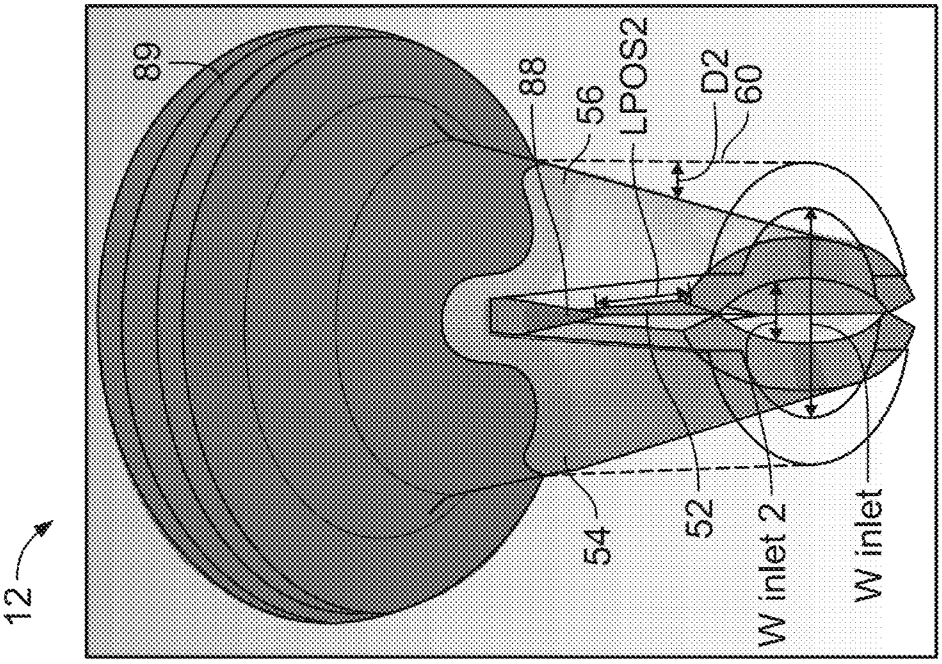
Neutral State vs. Second Position
FIG. 12B
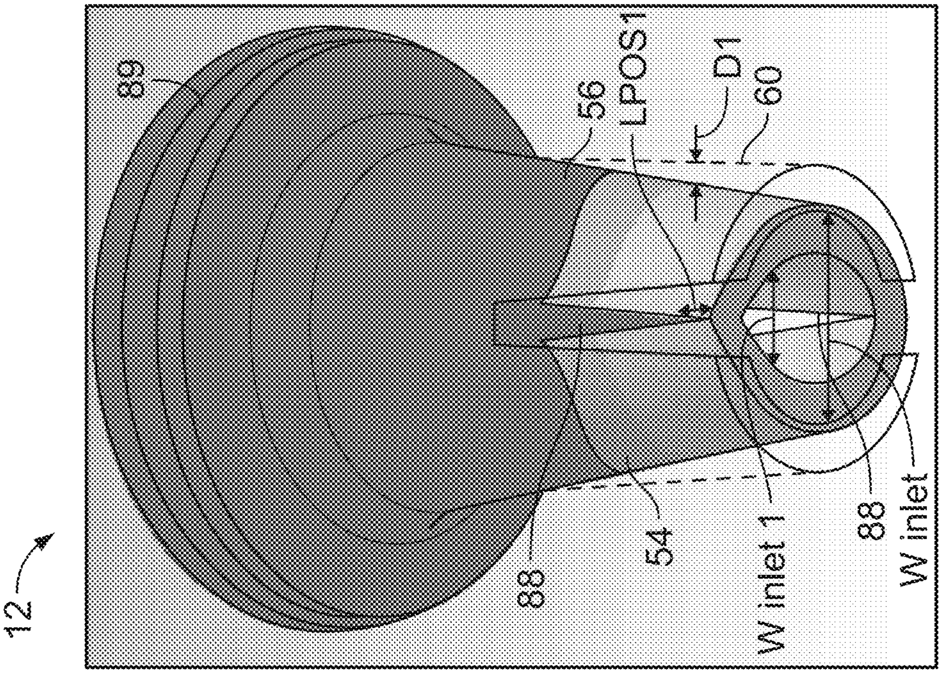
Neutral State vs. First Position
FIG. 12A
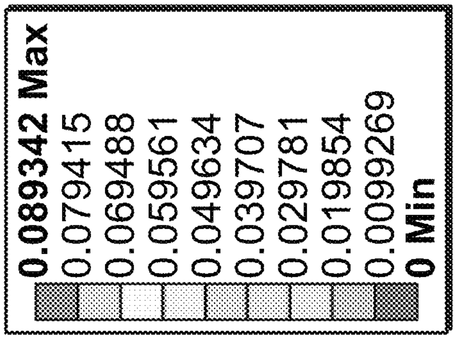

PRESSURE REGULATION DEVICE AND METHOD FOR IRRIGATION SPRINKLERS

CROSS-REFERENCE TO RELATED APPLICATIONS

This application claims benefit of and priority to U.S. Provisional Application No. 63/114,320, filed Nov. 16, 2020.

FIELD OF TECHNOLOGY

This invention relates to irrigation sprinklers and, more particularly, to a pressure regulation device and method for regulating fluid pressure within an irrigation sprinkler system.

BACKGROUND

Sprinklers are commonly used for landscape irrigation. It is common for a sprinkler to include a stem with an inlet at one end and a nozzle attached to the other end. One type of stem is a fixed stem. With the fixed stem, one end is connected to a water supply, usually at a point below ground, and the other end extends above ground and is fitted with the nozzle. Another type of stem is used in a "pop-up" sprinkler as a riser. A pop-up sprinkler is typically buried in the ground and includes a stationary housing and a riser, mounted within the housing. During an irrigation cycle, the riser extends through an open upper end of the housing and projects above ground level, or "pops up", to distribute water to surrounding terrain. More specifically, pressurized water is supplied to the sprinkler through a water supply line attached to an inlet of the housing. The pressurized water causes the riser to travel upwards against the bias of a spring to the elevated spraying position above the sprinkler housing to distribute water to surrounding terrain through one or more spray nozzles. When the irrigation cycle is completed, the pressurized water supply is shut off, and the riser is spring-retracted back into the sprinkler housing so that the top of the nozzle, which is attached to the riser, is at or slightly below ground level.

One concern in landscape irrigation is minimizing water waste and loss. Water conservation has become increasingly significant in landscape irrigation. Many communities regulate the use of water for landscape irrigation. These regulations require that water be emitted from a sprinkler within a certain pressure range. Without a pressure regulator, water is commonly emitted at a pressure exceeding the regulated range. Moreover, when a sprinkler is operated at pressures above the design pressure (e.g., 30 psi for spray heads), more water is unnecessarily used, and the sprinkler is less efficient.

In addition, unnecessary water usage is caused when the nozzle on the stem or riser of a pop-up sprinkler is removed or damaged. For example, a vandal may intentionally damage the sprinkler or cause the nozzle to become partially or completely detached. The damage or removal may not be immediately evident to the user and may result in continued loss of water over an extended time period. In both instances, this water discharge may result in overwatering or even flooding, causing damage to the landscape and other items. Further, overwatering some areas may result in underwatering in other areas because the damaged sprinkler is part of a network and other sprinklers experience a decrease in water pressure.

Concerns with water loss in landscape irrigation applies to the use of reclaimed water for landscape irrigation. Reclaimed water allows communities to use their water resources for multiple purposes, including landscape irrigation. Many communities have laws and regulations that limit the waste and runoff of reclaimed water. It is therefore desirable to design and install irrigation sprinklers that address excessive water usage.

Accordingly, it would be desirable to include a pressure regulation device for use with irrigation sprinklers, including their stem, riser, and nozzle filter. It also would be desirable for such pressure regulation device to automatically reduce the flow of water through the sprinkler (and subsequent water loss) when the nozzle is detached from the rest of the sprinkler, such as due to the routine exchange of nozzles, due to maintenance, or due to vandalism or other damage to the nozzle.

BRIEF DESCRIPTION OF THE DRAWINGS

FIG. 12A is a perspective view of the pressure regulation device of FIG. 5 in a first state relative to the neutral state;

FIG. 12B is a perspective view of the pressure regulation device of FIG. 5 in a second state relative to the neutral state.

DETAILED DESCRIPTION

Figure 1:
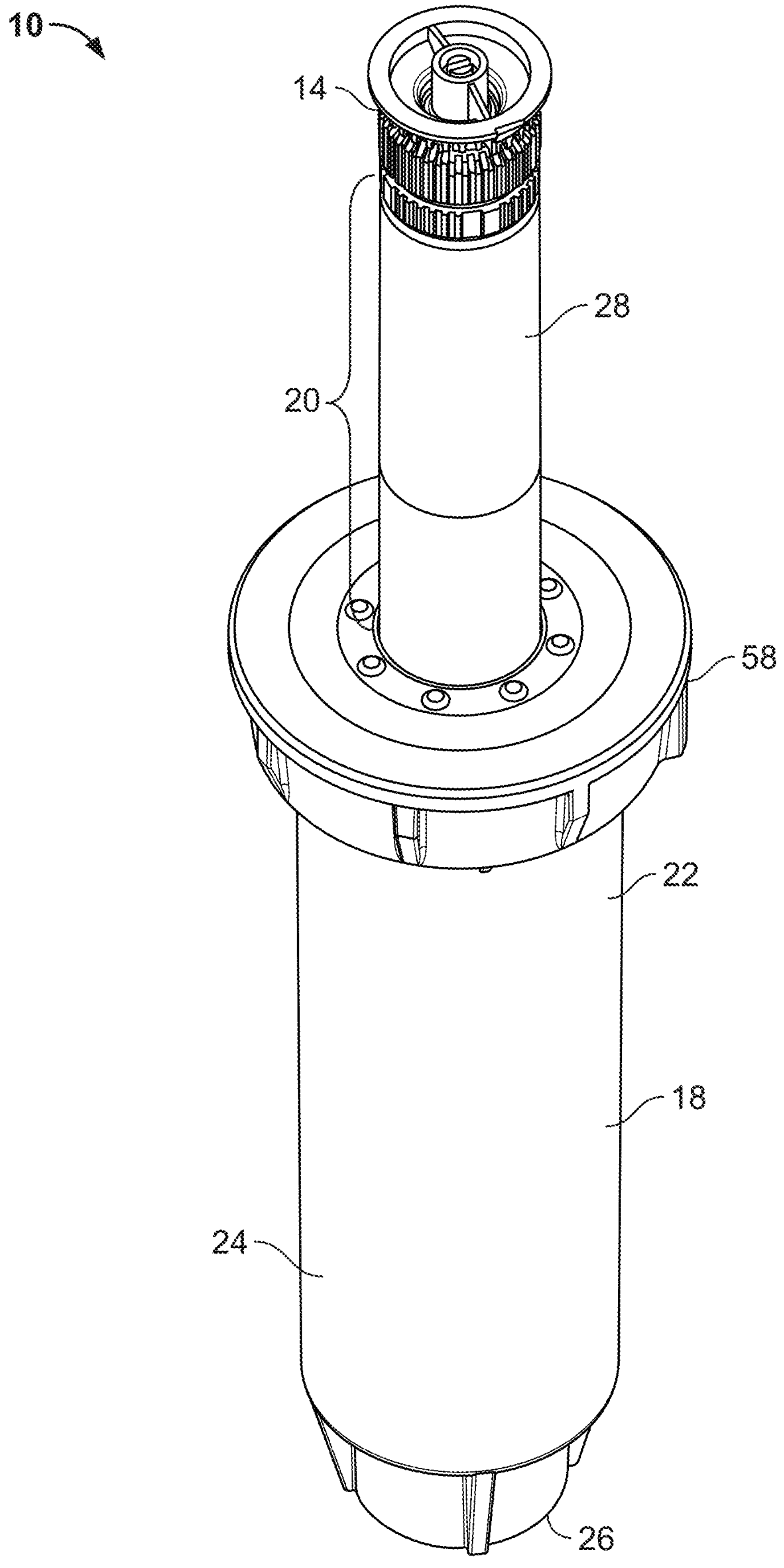
FIG. 1 is a perspective view of an irrigation sprinkler according to some embodiments.
Figure 2:
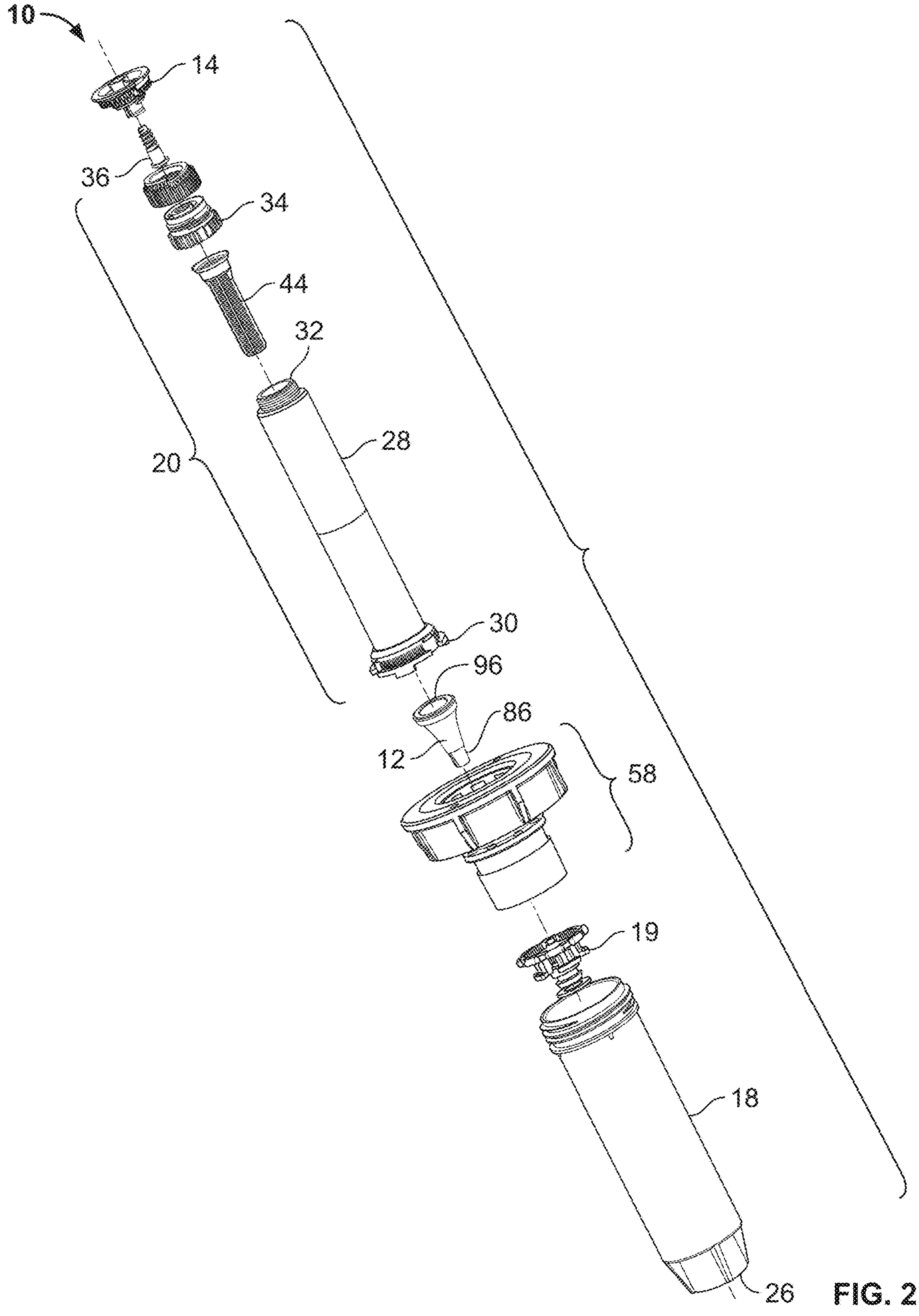
FIG. 2 is an exploded perspective view of the irrigation sprinkler of FIG. 1.

As shown in FIGS. 1-4, a pop-up sprinkler 10 is provided having a pressure regulation device (hereinafter referred to as regulator 12) therein. The regulator 12 is disposed upstream of a nozzle 14 to automatically regulate the pressure of water flowing to the nozzle. The regulator maintains the water pressure at a predetermined pressure, such as the pressure that optimizes the performance of the nozzle 14. So, if the supply pressure is above the predetermined pressure for the nozzle 14, the regulator 14 automatically reduces the pressure to the predetermined pressure. In addition to regulating, the regulator 14 will close down to almost no or almost no flow in the event the nozzle 14 is removed from the sprinkler 10 for ordinary maintenance and replacement, accidental damage or vandal removal. In this event, the regulator 12 may be designed to provide a visual indicator as an alert that the nozzle has been removed from the sprinkler 10.

The pop-up sprinkler 10 is one exemplary type of sprinkler that may be used with the regulator 12. The sprinkler 10 and many of its components are similar to that shown and described in U.S. Pat. Nos. 4,913,352; 6,997,393; and 8,833,672, which have each been assigned to the assignee of the present application and all of which are incorporated by reference herein in their entirety. Operation of the regulator 12 generally involves limited interaction with the internal structure and components of the sprinkler and, therefore, is suitable for many different types of sprinklers, including, for example, a fixed stem sprinkler.

Figure 3:
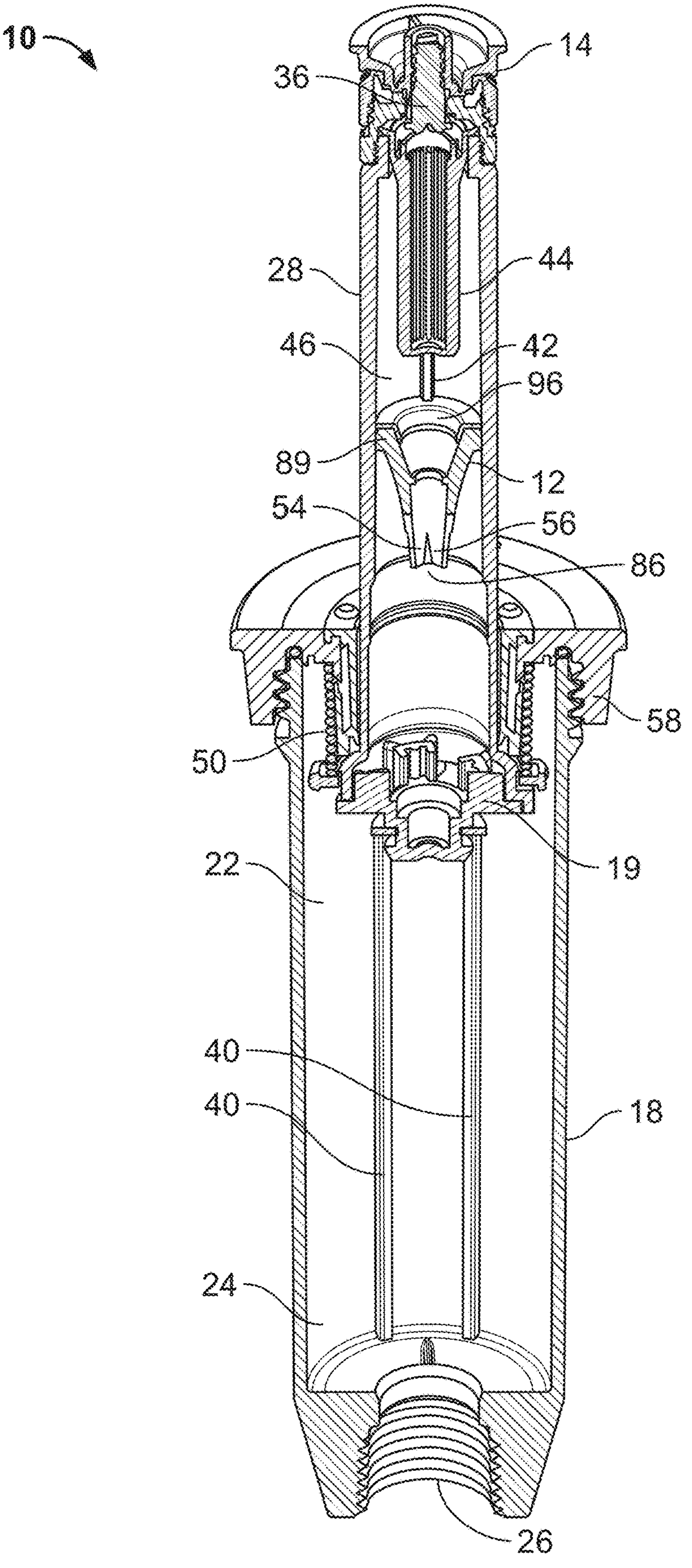
FIG. 3 is a cross-sectional view of the irrigation sprinkler of FIG. 1.
Figure 4:
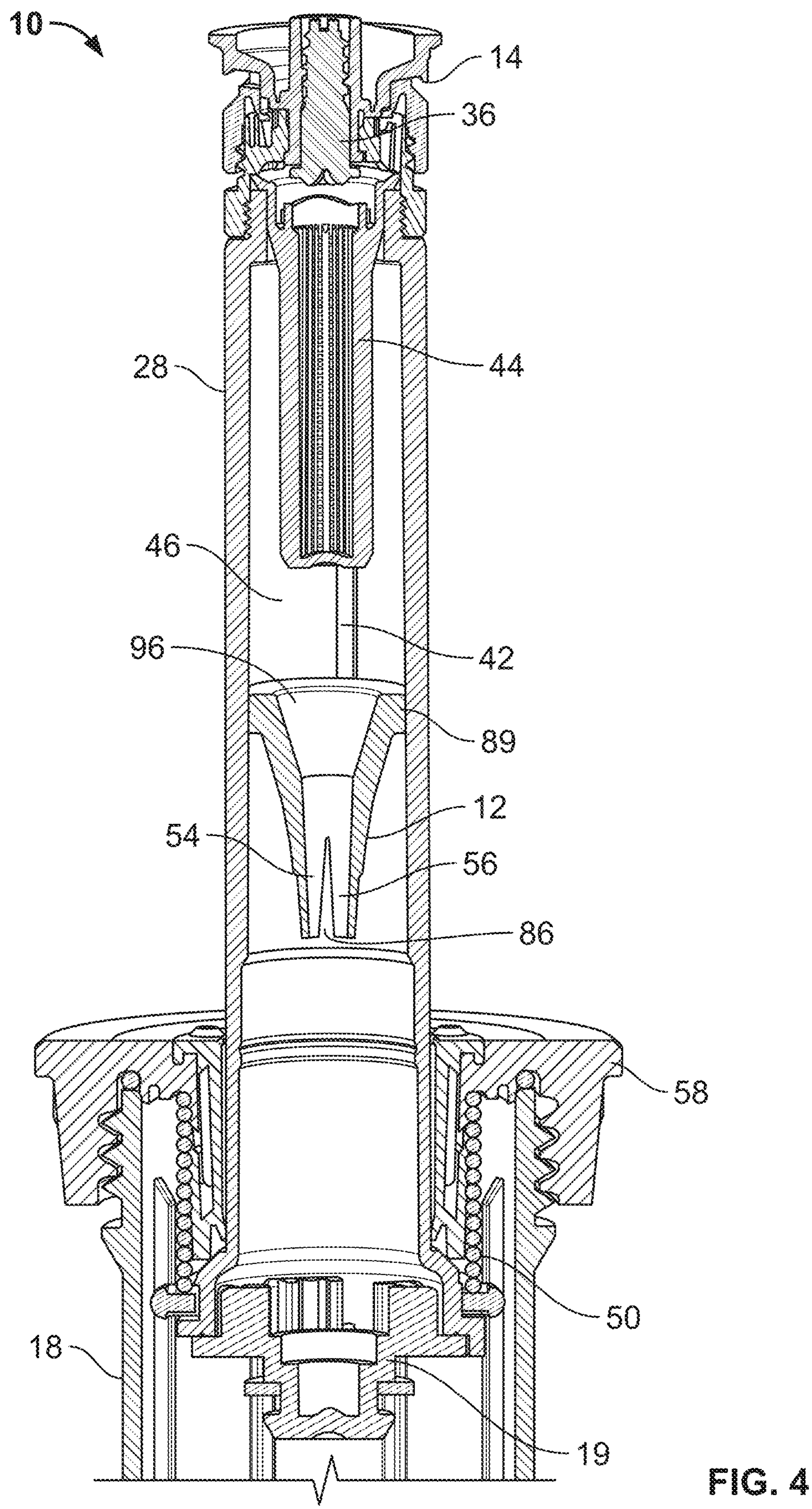
FIG. 4 is an enlarged cross-sectional view of the riser assembly of a portion of the irrigation sprinkler of FIG. 3 showing a pressure regulation device disposed within the stem.

The sprinkler 10 generally includes a housing 18 and a riser assembly 20. The riser assembly 20 reciprocates between a spring-retracted position and an elevated irrigation position, in response to water pressure. The spring-retracted position is described in more detail in U.S. Pat. No. 8,833,672. When the supply water is on, such as being pressurized for during an irrigation cycle, the riser assembly 20 extends ("pops up") from the housing 20 to be above ground level so that water can be distributed to the surrounding terrain. When the water is shut off at the end of a watering cycle, the riser assembly 20 retracts into the housing 18 where it is protected from damage. FIGS. 1, 3 and 4 illustrate the sprinkler 10 in the elevated position.

The housing 18 provides a protective covering for the riser assembly 20 and, together with the riser assembly 20, serves as a conduit for incoming water under pressure. The housing 18 preferably has a generally cylindrical shape and is preferably made of a sturdy lightweight injection molded plastic or similar material, suitable for underground installation with the upper end 22 disposed substantially flush with or slightly below the surface of surrounding soil. The housing 18 preferably has a lower end 24 with an inlet 26 that is threaded to connect to a correspondingly threaded outlet of a water supply pipe (not shown). The sprinkler 10 may be one of a plurality of coordinated sprinklers in an irrigation network.

In a preferred form shown in FIGS. 1-4, the riser assembly 20 includes a non-rotatable stem 28 with a lower end 30, and an upper threaded end 32. The stem 28 is preferably cylindrical in shape and is preferably made of a lightweight molded plastic or similar material. The nozzle 14 includes an internally threaded base 34 that threads onto the upper threaded end 32 for attaching the nozzle 14. The nozzle 14 discharges water outwardly from the sprinkler 10 when the riser assembly 20 is in the elevated position. Any of various interchangeable nozzles may be used to create the desired arc of coverage or throw radius.

A throttling screw 36 is preferably included in the nozzle 14 to enable flow through a radius of the nozzle 14. The terminal end of the throttling screw 36 is moved toward and away from a seat formed at a top end of a filter 44. During movement of the riser assembly 20 between the retracted and elevated positions, the riser assembly 20 is restrained against rotation and guided by ribs 40 extending longitudinally along an inside surface of the housing 18. The sprinkler 10 also preferably includes a filter 44 attached to the nozzle 14 and in the riser assembly 20 for filtering particulate material in the supply water prior to passing through nozzle 14. An example of a filter 44 is shown and described in U.S. Pat. No. 4,913,352. With the nozzle 14 and the filter 44 installed in the configuration provided in FIGS. 1, 3 and 4, the filter 44 extends downwardly into the riser assembly 20. Further, as should be evident, various types of filters may be used with the sprinkler 10 and regulator 12. Filters for use within the sprinklers of the present embodiments may also have different shapes and dimensions. Indeed, other types of filters or components may be sized to accomplish the same function within the illustrated sprinkler 10.

A spring 50 for retracting the riser assembly 20 is preferably disposed in the housing 18 about an outside surface of the stem 28. The spring 50 biases the riser assembly 20 toward the retracted position until the water pressure reaches a predetermined threshold pressure. Typically, the threshold pressure is in the range of about 5-10 psi, at which time the water supply pressure acting on riser assembly 20 will be sufficient to overcome the force of the spring 50 and cause movement of the riser assembly 20 to the elevated irrigation position illustrated in FIGS. 1, 3 and 4. A housing cover 58 serves to minimize the introduction of dirt and other debris into the housing 18. The housing cover 58 preferably has internal threads and is mounted to the upper end of the housing 18 which has corresponding external threads. The housing cover 58 has a central opening lined with an annular wiper through which the elongated riser assembly 20 reciprocates between the retracted position and the elevated position. The wiper removes debris from the riser assembly 20.

During irrigation, water or pressurized fluid enters the sprinkler 10 through the inlet 26 and flows through the housing 18 and through a check valve 19 (which is optional). The fluid then enters the riser assembly 20 and moves the riser assembly 20 upwardly to the elevated irrigation position. In the embodiments illustrated herein, the fluid subsequently enters the regulator 12 at a regulator inlet 86, flows through a flow passage 92 in the regulator 12, exits a regulator outlet 96, flows through the remainder of the stem 28 to the filter 44, and finally out through the nozzle 14. In other embodiments, the regulator may be sized to the filter 44 of the nozzle 14, and therefore, fluid flow through the regulator 12 may take place within the filter 44. Locating the nozzle 14 in the filter 44 would make the top of the regulator 12 serviceable (i.e., the sprinkler 10 would not have to be uninstalled to service the regulator 12).

As illustrated in the embodiments provided in FIGS. 3 and 4, the regulator 12 may be disposed within the stem 28 of the sprinkler 10 and provides automatic regulation as described below. The regulator 12 may be molded as a single piece structure of a thermoplastic elastomer material and is suitable for injection molding. The regulator 12 may also be molded from a thermoset material.

The regulator 12 has an enlarged portion or substantially circular, annular lip or retainer collar 89 that provides a water-tight seal against fluid flow between the regulator 12 and an inner wall 46 of the stem 28. The retainer collar 89 also provides a friction fit with the inner wall 46 to resist movement of the retainer collar 89 in the stem 28. To further prevent movement in the stem 28, particularly downstream movement, the retainer collar 89 abuts one or more stem ribs 42 extending longitudinally along at least a portion of the inner wall 46 of the stem 28.

The operation and configuration of the regulator 12 will be discussed in further detail below. In general, the regulator 12 is configured to decrease the water pressure of the water flowing downstream of the regulator 12 so that it is at a predetermined pressure. The predetermined pressure may be the pressure at which performance of the nozzle 14 is optimized. When the nozzle 14 is working at its optimal performances, it provides the requisite amount of water without over-watering and wasting water. Optimal water pressures for nozzles are typically in the 15 to 30 psi, with an optimum pressure being 30 psi. So, for example, the regulator 12 may be designed to maintain the downstream pressure at 30 psi. Without the regulator 12, water pressure above the desired amount for the nozzle 14 would cause over-watering and, thus, unnecessary use of water.

In addition to regulating water pressure to the nozzle 14, the regulator 12 also minimizes water waste when a nozzle 14 has been removed for regular maintenance or due to vandalism. In these circumstances, the regulator 12 will close to shut off or limit to a small amount the volume of water discharging from the stem 28. Further, the regulator 12 may not close completely in order to allow a small amount of water at a high velocity to exit the stem 28 to produce a small stream of water jetting into the air as a visual signal that the sprinkler 10 needs maintenance. This signal allows for earlier detection of the damaged sprinkler 10 and re-installation of the nozzle 14. Moreover, although the regulator 12 has been described relative to one form of sprinkler 10, it should be apparent that the regulator 12 may be used with various other sprinkler types. For example, although shown with a spray head type sprinkler, the regulator 12 may be used with fixed stem sprinklers or rotor type sprinklers having a mechanism for effecting rotation of a turret in the riser assembly 20.

Figure 5:
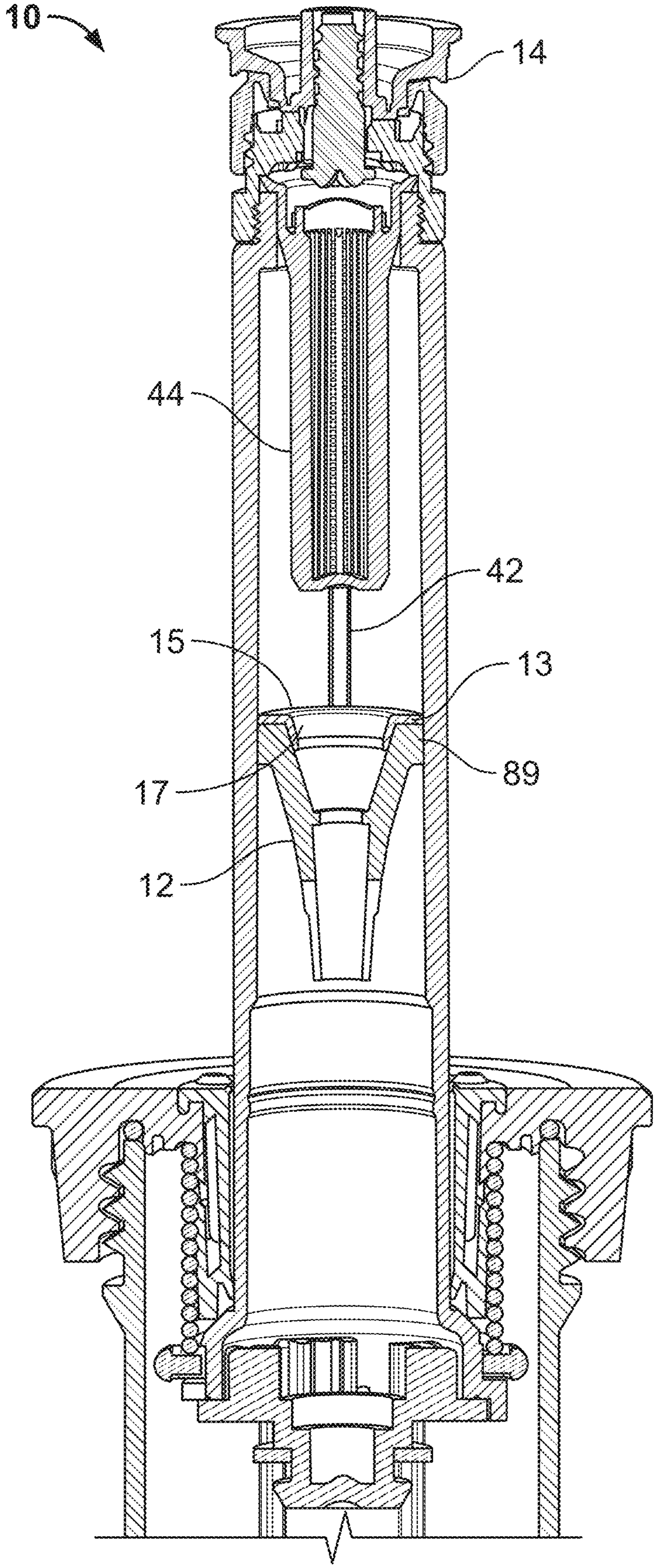
FIG. 5 is a cross-sectional view of a portion of the irrigation sprinkler of FIG. 1 further including a collar support for the pressure regulation device.
Figure 6:
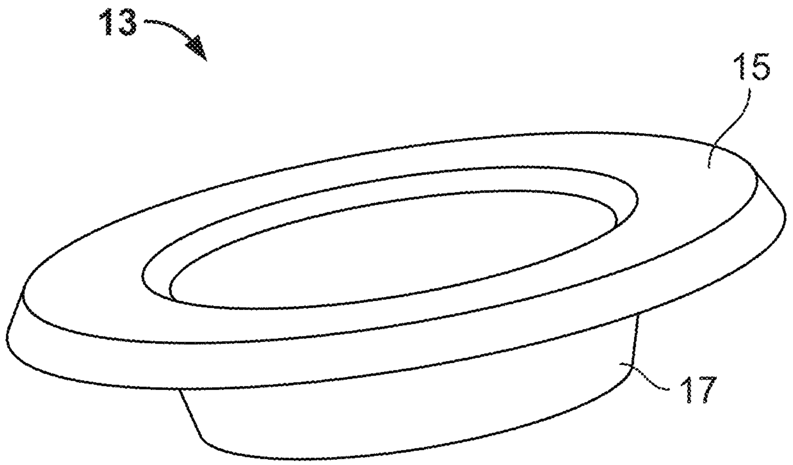
FIG. 6 is a perspective view of the collar support illustrated in FIG. 5.

FIG. 5 is a cross-sectional view of the sprinkler 10 of FIG. 1 with the addition of a collar support 13 disposed within the stem 28 at the downstream end of the regulator. The collar support 13 is an optional feature that prohibits longitudinal downstream movement of the regulator 12 when under pressure. Like the collar 89, the collar support 13 is provided within the stem 28 and is sandwiched between the collar 89 and one or more stem ribs 42 extending longitudinally along at least a portion of the inner wall 46 of the stem 28. As shown in FIGS. 5 and 6, the collar support 13 has an annular shape with two adjoining walls, a first wall 15 that engages an upper surface of the collar 89, and a second wall 17 that engages and surrounds at least a portion of an inner surface of the collar 89 of the regulator 12. The collar support 13 has a profile that matches the outlet end portion of the regulator 12. The collar support 13 may be made of a harder material (i.e., a material having a greater geometric stiffness) than that of the regulator 12 itself, such that it withstands and distributes the pressure of fluid flowing through the regulator 12 and prevents the regulator 12 from being forced downstream and out of position.

Figure 7A:
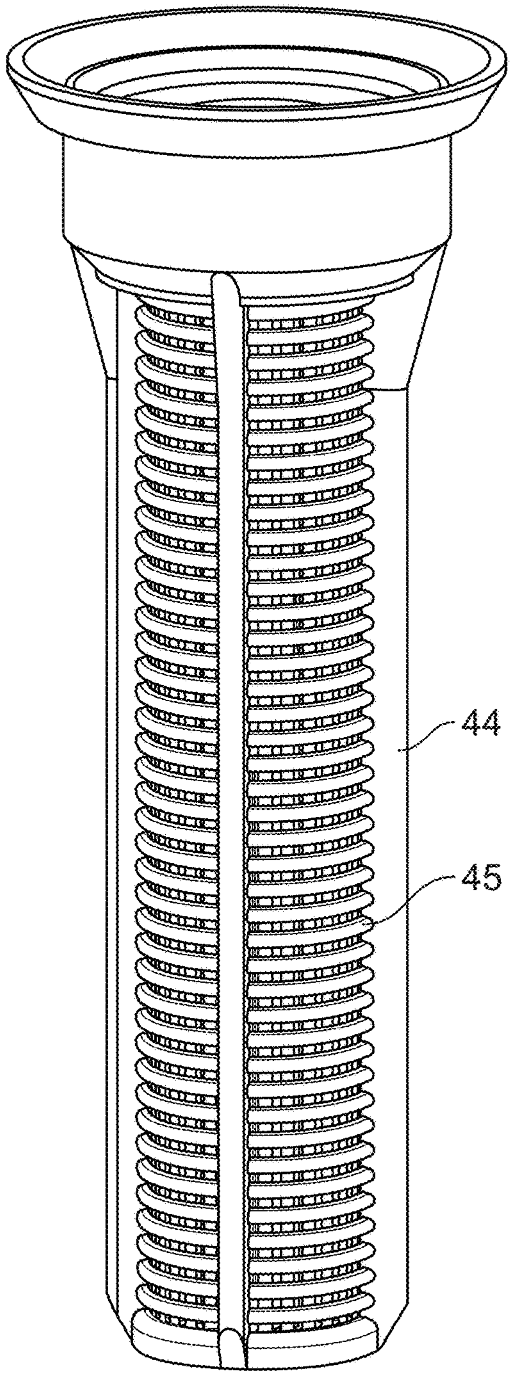
FIG. 7A is a perspective view of a nozzle filter with a pressure regulation device according to some embodiments.
Figure 7B:
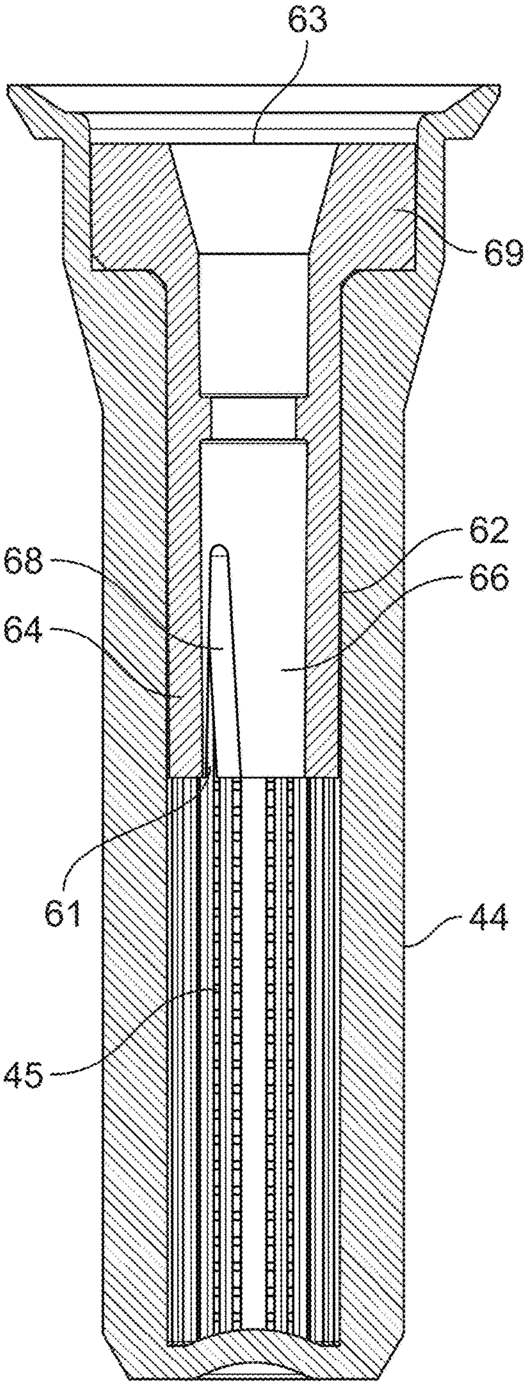
FIG. 7B is a cross-sectional view of the nozzle filter of FIG. 7A.
Figure 8:
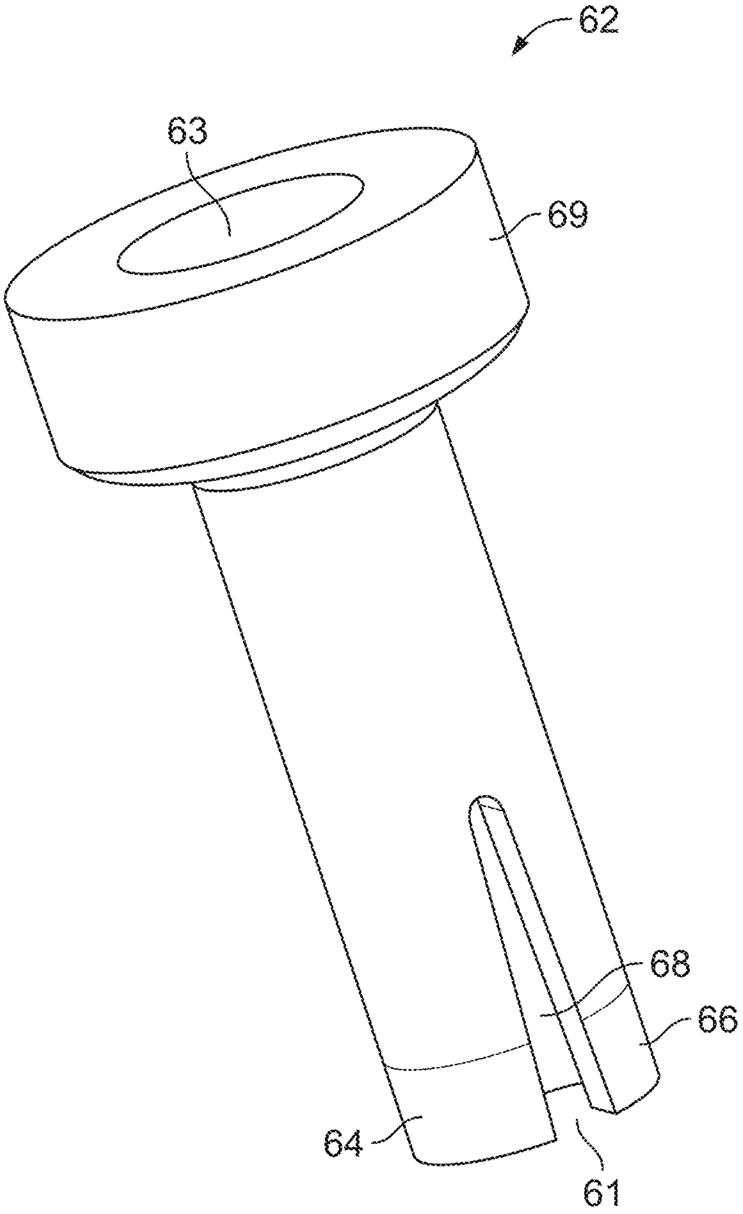
FIG. 8 is a perspective view of the pressure regulation device disposed within the nozzle filter of FIGS. 7A and 7B.

Embodiments of a regulator described herein may be scaled in size to be carried in the filter 44 of the nozzle 14. For example, FIG. 7A is a perspective view of a nozzle filter 44, and FIG. 7B is a cross sectional view of a regulator 62 disposed within the nozzle filter 44 of FIG. 7A. As illustrated in FIG. 8, the regulator 62 has an inlet 61, an outlet 63, and a collar 69. The regulator has two slots 68 defining at least two sidewalls 64 and 66. When fluid is flowing through the mesh or screen 45 of the filter 44, it enters the inlet 61 and encounters the sidewalls 64 and 66. The sidewalls 64, 66 regulate the pressure similar to that described in greater detail below for regulator 12. As fluid flow increases, regulator 62 floats upward within the filter 44 and stops against the nozzle 14, and the collar 69 forms a seal at the top of the filter 44. One benefit of having the regulator 62 in the filter 44 is the ability to easily access the regulator 62 for maintenance or replacement. In addition, the regulator 62 may be scaled or sized relative to a given filter 44 for a desired sprinkler application.

Figure 9:
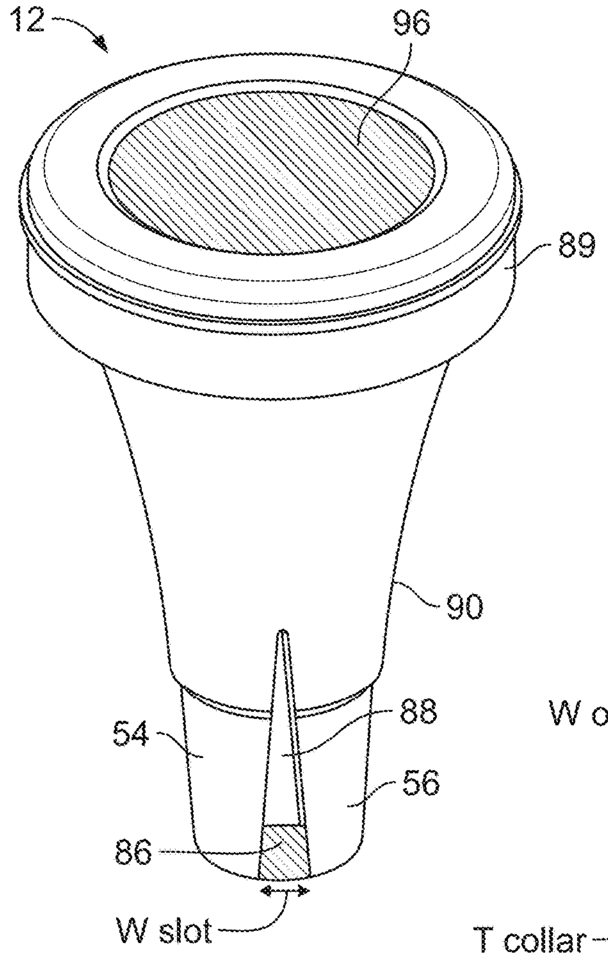
FIG. 9 is a perspective view of the pressure regulation device of FIG. 4 in a neutral state.
Figure 10:
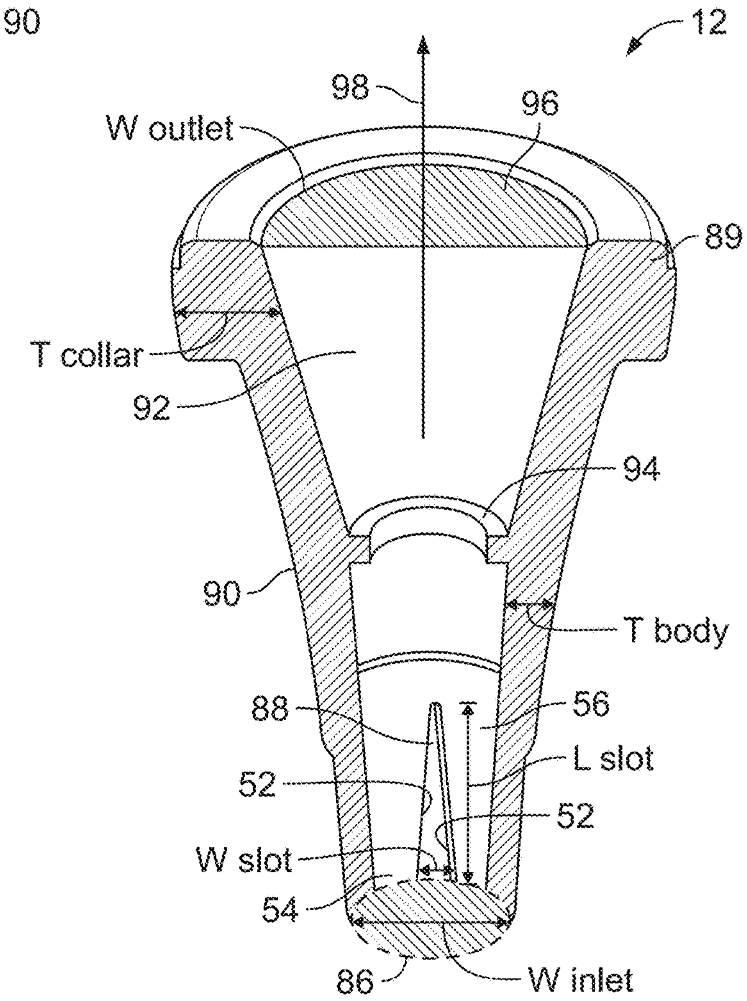
FIG. 10 is a cross-sectional view of the pressure regulation device of FIG. 9.

With reference to FIGS. 9 and 10, the regulator 12 is shown in its neutral state, i.e., a condition when there is no fluid flowing through the regulator 12. The regulator 12 has a body 90 that defines a flow passage 92 for pressurized fluid flow through the regulator 12 in the direction of arrow 98. The flow passage 92 extends longitudinally through the entire length of the regulator 12. Fluid flows through the regulator 12 by entering the flow passage 92 at a regulator inlet 86 and exiting the flow passage 92 at a regulator outlet 96.

The regulator 12 may be designed with different dimensions depending on the size of the riser and the performance characteristics of the nozzle 14. The following identifies certain dimensions of the regulator 12 for reference. The diameter or maximum width of the regulator inlet 86 in a neutral state ($W_{inlet}$), the diameter or maximum width of the regulator outlet 96 ($W_{outlet}$) and other dimensions associated with the regulator 12 may be selected to control the pressure exiting the regulator outlet 96. The diameter of the flow passage 92 is preferably selected to balance design considerations, including reduction of water loss exiting the sprinkler 10, and providing a volume sufficient to flush debris from the sprinkler 10.

Figure 11:
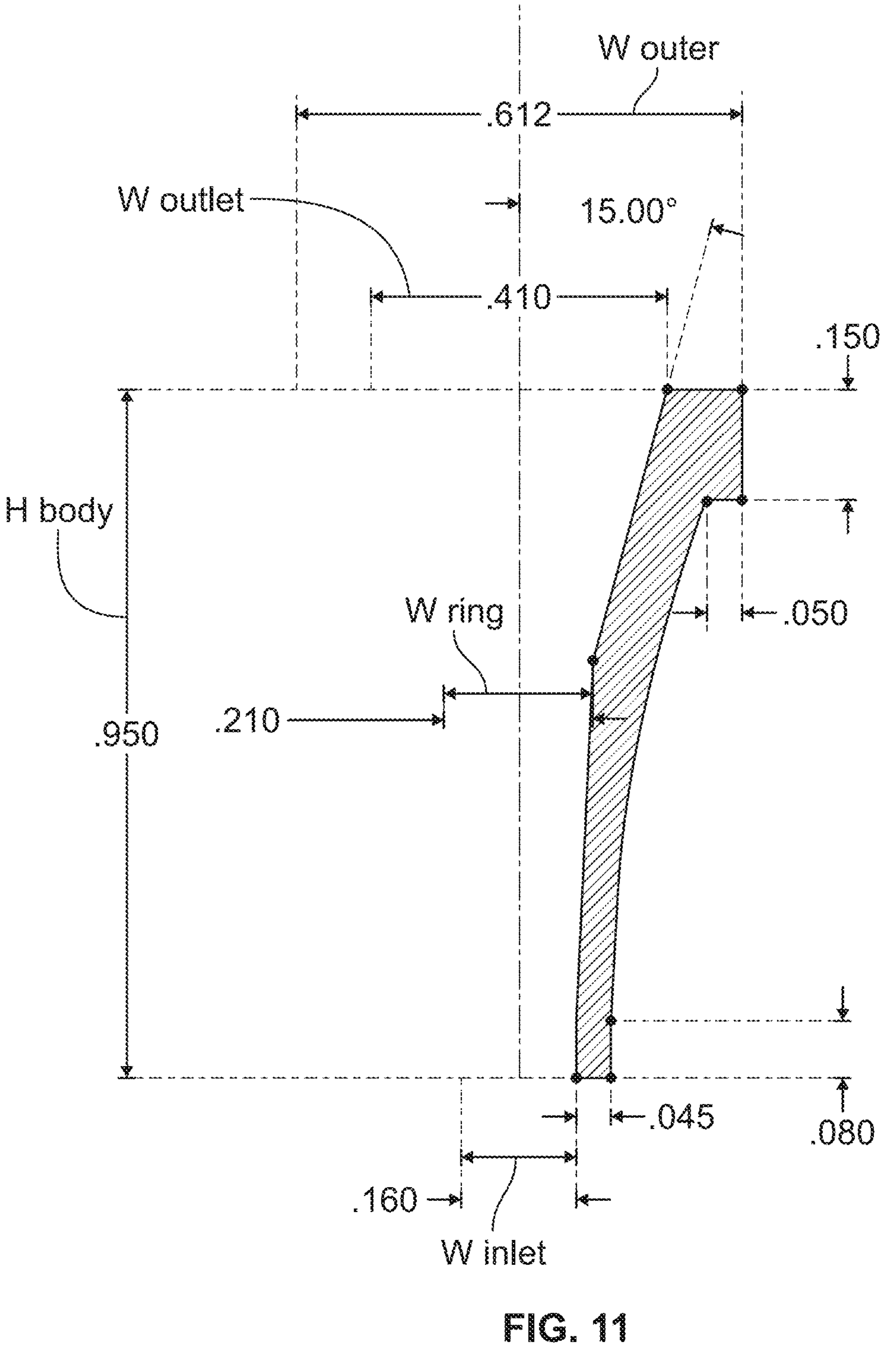
FIG. 11 is a cross-sectional view showing dimensions of an exemplary pressure regulation device, according to some embodiments.

FIG. 11 is a cross-sectional view of one side the pressure regulation device 12 showing exemplary dimensions. For example, the regulator 12 may have a height ($H_{body}$) of approximately 0.95 inches. An outer diameter of the outlet ($W_{outer}$) may be approximately 0.612 inches, the diameter of the outlet ($W_{outlet}$) may be approximately 0.41 inches, and the inlet ($W_{inlet}$) may be approximately 0.16 inches. A width ($W_{ring}$) of the ring 94 in a neutral state may be approximately 0.21 inches. FIG. 11 provides additional exemplary dimensions in inches. These and other dimensions of the embodiments of regulators described herein may be sized or adjusted for a given stem or filter within a desired irrigation sprinkler application.

With reference again to FIGS. 9 and 10, the flow passage 90 has a downstream portion that is conical in cross-section and an upstream portion that has a constant cross-section. The preferred design has a $W_{outlet}$ greater than $W_{inlet}$. The regulator 12 has three main segments or portions. The first segment is the collar portion 89 which acts as a sealing bead and has a maximum radial thickness $T_{collar}$. The value of $T_{collar}$ is greater than the thickness of other portions of the body 90. The collar portion 89 is configured to maintain the water-tight seal against the inner surface of the stem 28 as water flows through the regulator 12 and to assist with maintaining the position of the regulator 12 within the stem 28. The collar portion 89 defines the regulator outlet 96.

In a preferred form, the body 90 narrows upstream towards the second segment, or intermediate portion or ring 94, such that a maximum diameter of the collar portion 89 is greater than a maximum diameter of the ring 94. As fluid pressure increases, the ring 94 is configured to bend downstream causing its upstream edge to deflect inward to provide an increased constriction of the flow passage 92, which results in increased pressure reduction downstream (i.e., decreased fluid pressure at the outlet 96). In some embodiments, more than one ring 94 may be defined within the body 90. An advantage of this feature is that it enables additional adjust-ment or tuning of the design of the regulator 12 to provide a desired pressure regulation profile.

Further, a maximum horizontal wall thickness ($T_{body}$) of either the second or the third segments at any point along the body 90 decreases downstream towards the collar portion 89, such that $T_{body}$ is always less than $T_{collar}$. The third segment of the regulator 12 is located at the upstream end portion of the body 90 and has a plurality of slots 88 defined therein. In the embodiments illustrated, only two slots 88 are provided, and are diametrically opposed from one another on the third segment of the body 90. However, it can be appreciated that a plurality of slots 88 greater than two may be provided creating more than two sidewalls.

The slots 88 are preferably identical and are generally V-shaped. Each slot 88 has a vertical length $L_{slot}$, which is measured from a downstream end of the slot 88 to the regulator inlet 86. Further, each slot 88 is defined within the body 90 and extends from an outer surface of the body 90 through to the flow passage 92, forming at least two adjacent and substantially identical sidewalls, namely, a first sidewall 54 and a second sidewall 56. In a neutral state 60 with no fluid flow, the maximum distance between the first sidewall 54 and the second sidewall 56 at the regulator inlet 86 ($W_{slot}$) is greater than zero. Due to the V-shaped configuration of the slots 88, the distance between opposing points on the first sidewall 54 and the second sidewall 56 is not necessarily constant or uniform. Rather, in the neutral state 60, the first sidewall 54 and the second sidewall 56 have a gradually reduced horizontal distance between them as you measure from the regulator inlet 86 downstream towards the intermediate portion 94. If the desired nozzle pressure is 30 psi, the regulator inlet 86 needs to have a cross-sectional area large enough to not restrict flows at or below 30 psi. The length of the slots 88 and thickness of the sidewalls can be tuned to meet the desired downstream pressure. For example, when $L_{slot}$ is increased, the geometric stiffness of the regulator 12 is lowered, making it easier for the sidewalls 54 and 56 to flex and deform. In some embodiments, $L_{slot}$ may be increased to increase pressure regulation at lower flow rates. In some other embodiments, using a material with a lower flex modulus for the pressure regulator 12 may also be employed to provide greater flexibility and increased deformity of the sidewalls 54, 56 of the regulator 12, which will similarly provide increased pressure regulation, particularly at lower fluid flow rates.

When fluid is flowing through the flow passage 92, the regulator 12 has a two-stage deflection process to perform regulation. The two-stages are created by movement of opposing facing surfaces 52 of the first sidewall 54 and the second sidewall 56, which are configured to deform or move towards one another and even contact each other. FIGS. 12A and 12B illustrate the two different deformed states (i.e., positions or stages) of the regulator 12, namely a first state in FIG. 12A and a further deformed second state in FIG. 12B. Each of the first state and second state are illustrated relative to the neutral state, which is identified by dashed lines 60, and discussed above. The regulator 12 also may be designed so that when the supply fluid pressure is less than or equal to the desired pressure for the nozzle then the regulator remains in its neutral state 60. As noted above, in the neutral state 60, the facing surfaces 52 of the first sidewall 54 and the second sidewall 56 are initially separated at the regulator inlet 86 by a maximum horizontal distance $W_{slot}$, and a diameter of the regulator inlet 86 is $W_{inlet}$.

Turning to FIG. 12A, when fluid flows through the regulator 12 at a pressure above the predetermined pressure for the regulator 12, the pressure acts on the first sidewall 54 and the second sidewall 56 to deform and move them towards each other. The first state occurs when an outer surface of the sidewalls 54,56 move inward, such that for a given point along the body 90, a horizontal distance $D_1$ (greater than zero) can be measured relative to the same point along the body 90 in the neutral state 60. In the first state, the value of $W_{slot}$ equals zero. When $W_{slot}$ equals zero, the first sidewall 54 and the second sidewall 56 are adjacent, touching and in direct contact at the regulator inlet 86. Further, in the first state, there is a measurable vertical length $LPOS_1$, which is a distance measure of a length of vertical contact occurring between the opposing facing surfaces 52 of the first sidewall 54 and the second sidewall 56. In the first state, a maximum width $W_{POS1}$ or diameter of the regulator inlet 86 is less than $W_{inlet}$. As a result, the regulator inlet 86 creates a constriction which allows less fluid through the fluid passage 92 relative to the neutral state 60, resulting in a pressure drop across the regulator 21 from the regulator inlet 86 to the regulator outlet 96.

FIG. 12B illustrates the second state where there is further deformation of the upstream end portion of the regulator 12. The second state of FIG. 12B occurs when the pressure of fluid at the regulator inlet 86 in the second state is greater than a pressure of the fluid entering the regulator inlet 86 in the first state. This additional pressure acts on the outside of the regulator 12 causing additional deformation, movement, and flattening of the sidewalls 54, 56. As a result, a horizontal distance $D_2$ measured at a same point along the body 90 in the first state is greater than $D_1$. The additional deformation or flattening causes the sidewalls 54, 56 to increase the surface area of the facing surfaces 52 that are touching such that a measurable vertical length $L_{POS2}$ is greater than $L_{POS1}$. This indicates increased contact along the facing surfaces 52 of the sidewalls 54, 56. In addition, the maximum width $W_{inlet2}$ of the regulator inlet 86 in the second state is less than $W_{inlet1}$, indicating a further reduction in the size of the inlet 86 in the second state, creating an even further constriction and therefor pressure drop. Ultimately, the amount of fluid capable of entering the inlet 86 is lower in the second state, relative to the first state, resulting in a greater pressure drop across the regulator 12 from the regulator inlet 86 to the regulator outlet 96.

FIGS. 12A and 12B illustrate how the amount of deformation within segments of the body 90 of the regulator 12 changes, with the greatest deflection occurring at the regulator inlet 86 and decreasing downstream at the regulator outlet 96. Indeed, at the regulator outlet 96, there is little to no deformation. In addition, the amount of deformation or movement of the sidewalls increases as the water pressure at the sprinkler inlet 26 increases. As illustrated, there is greater deformation or movement of the sidewalls 54, 56 inward and towards each other in the second state of FIG. 12B because there is greater water pressure at the inlet 26, relative to the first state in FIG. 12A. As noted above, ring 94 also deforms and provides additional constriction or narrowing of the flow path 92. The greater the fluid pressure at the inlet 86, the greater the deformation of the ring 94, which provides additional fluid pressure regulation at the regulator outlet 96.

Figure 13:
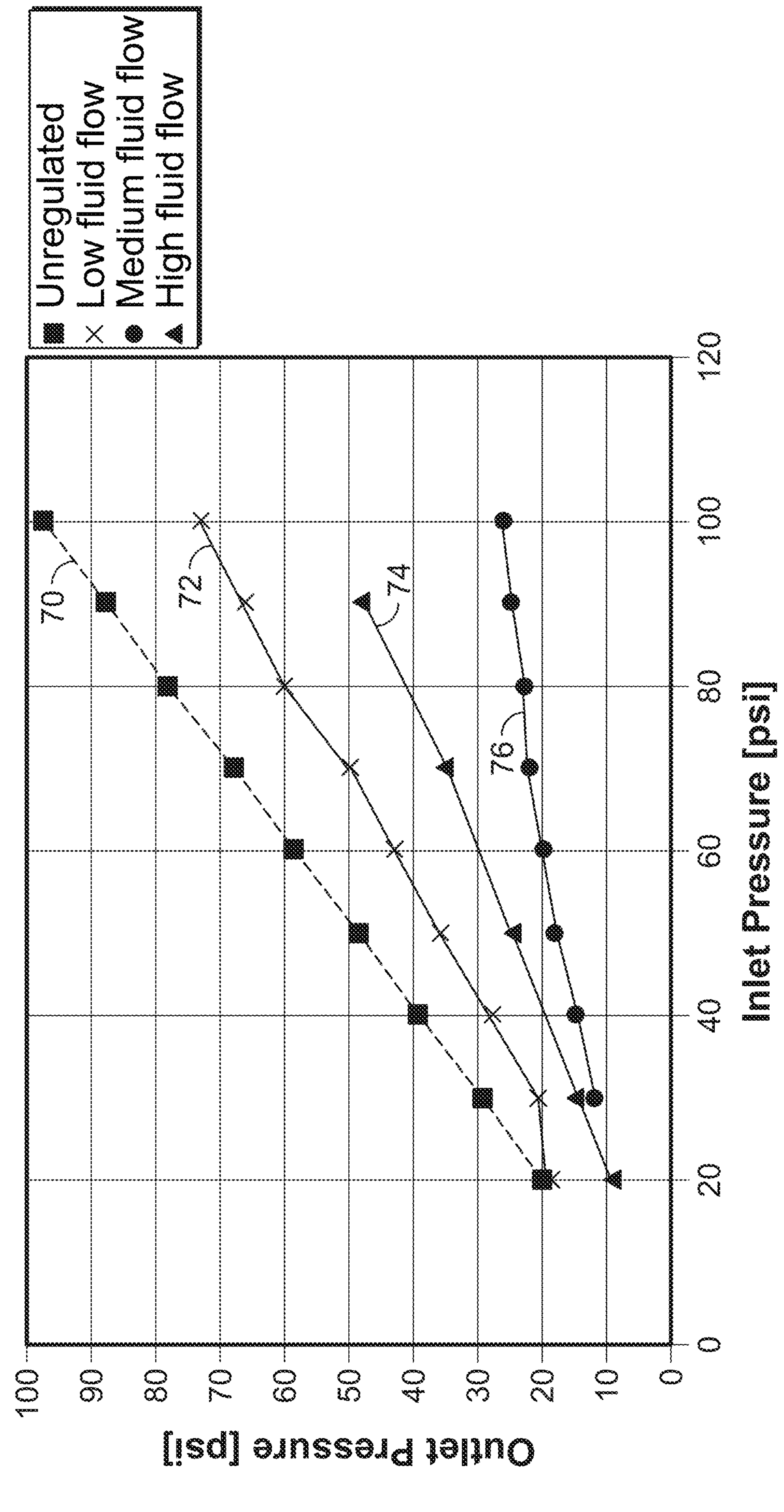
FIG. 13 is a graphic illustration of a comparison of sample test results according to some embodiments.

FIG. 13 is a graphic illustration of a comparison of sample test results using embodiments of the pressure regulation device and methods herein under varying fluid flow conditions. The x-axis is a measurement of regulator inlet pressure and the y-axis is a measurement of regulator outlet pressure, both measured in pressure per square inch (psi). Each of the curves 72, 74 and 76 show a regulator output pressure for a given regulator inlet pressure for three different fluid flow rates, namely high, medium, and low. More specifically, curve 70 illustrates a linear relationship between the inlet and outlet for an unregulated sprinkler, i.e., a sprinkler without a pressure regulation device. The three curves were generated using a sprinkler fitted with three different nozzles, each have a different discharge flow rate (e.g., low fluid flow, medium fluid flow, and high fluid flow). As provided in the legend, curve 72 illustrates the output for the low fluid flow, curve 74 illustrates the output for the medium fluid flow, and curve 76 represents the high fluid flow. As illustrated by curve 72, in an unregulated sprinkler, the inlet pressure and outlet pressure are approximately one to one, namely the pressure at the inlet is the same as the pressure at the outlet. As the fluid flow conditions increase from the lowest flow in curve 72 to the highest flow conditions in curve 76, the slope of the curve decreases because the regulator provides an increasing reduction in output pressure as the flow discharge from the nozzle increases. In other words, as described herein, when the fluid flow increases, the regulator is configured to increasingly deform, reducing fluid flow and the corresponding outlet pressure. Given these results, under extreme conditions (e.g., when a nozzle is removed or destroyed), the regulator would operate to shut off fluid flow, such that it permits no to minimal flow to the nozzle.

It will be understood that various changes in the details, materials, and arrangements of parts and components which have been herein described and illustrated in order to explain the nature of the sprinkler and the regulator may be made by those skilled in the art within the principle and scope of the sprinkler and the regulator as expressed in the appended claims. Furthermore, while various features have been described with regard to a particular embodiment or a particular approach, it will be appreciated that features described for one embodiment also may be incorporated with the other described embodiments.

What is claimed is:

1. A sprinkler comprising:
- a stem having an inlet for receiving pressurized fluid for irrigation and an outlet;
- a nozzle coupled to the outlet of the stem for discharging pressurized fluid from the sprinkler for irrigation; and
- a regulator disposed within the stem to compensate for pressure differences at the inlet of the stem, the regulator comprising:
  - an outer annular wall defining a flow passage; and
  - a regulator inlet and a regulator outlet at opposite ends of the flow passage;
  - wherein the outer annular wall has a first portion interrupted by a plurality of slots, the plurality of slots defining at least a first outer wall and a second outer wall of the outer annular wall, and a second portion downstream of the first portion and the plurality of slots and being uninterrupted; and
  - wherein the first outer wall and the second outer wall being capable of moving relative to one another and having a neutral state relative to one another, with a first maximum distance between the first and second outer walls when there is no flow through the flow passage, and at a first state relative to one another when there is flow through the passage, and where there is a second maximum distance between the first and second outer walls that is less than the first maximum distance to reduce pressure of fluid exiting the regulator.

2. The sprinkler of claim 1, wherein the first and second outer walls include facing surfaces along the slots and the first state includes at least a portion of the facing surfaces engaging one another.

3. The sprinkler of claim 2 wherein the plurality of slots includes a width that varies along at least a portion of its length.

4. The sprinkler of claim 1, wherein the first state includes a slot width that is set based on a desired pressure of fluid flow at the outlet.

5. The sprinkler of claim 1, wherein the regulator further comprises an enlarged portion for engaging and sealing against an inner surface of the stem.

6. The sprinkler of claim 1, wherein the regulator is formed from a single piece of elastomer.

7. The sprinkler of claim 1 wherein the first outer wall and the second outer wall have a second state relative to one another when there is flow through the passage, and where there is a third maximum distance between the first and second outer walls that is less than the second maximum distance to reduce pressure of fluid exiting the regulator.

8. The sprinkler of claim 5, further comprising a support disposed within the stem adjacent to the enlarged portion to limit movement or prevent the body from moving downstream in the stem.

9. A regulator for compensating for pressure differences comprising:
- an outer annular wall defining a flow passage for fluid flow through the regulator; and
- a regulator inlet and a regulator outlet at either end of the flow passage;
- wherein the outer annular wall has a first portion interrupted by a plurality of slots, the plurality of slots defining at least a first outer wall and a second outer wall of the outer annular wall, and a second portion downstream of the first portion and downstream of the plurality of slots that is uninterrupted; and
- wherein the first outer wall and the second outer wall are capable of moving relative to one another and having a neutral state relative to one another with a first maximum distance between the first and second outer walls when there is no flow through the flow passage and a first state relative to one another when there is flow through the passage and where there is a second maximum distance between the first and second outer walls that is less than the first maximum distance to reduce pressure of fluid exiting the regulator.

10. The regulator of claim 9, wherein the first and second outer walls include facing surfaces along the slots and the first state includes at least a portion of the facing surfaces engaging one another.

11. The regulator of claim 9, wherein the plurality of slots includes a width that varies along at least a portion of its length.

12. The regulator of claim 9, wherein the first state includes a slot width that is set based on a desired pressure of fluid flow at the outlet.

13. The regulator of claim 9, wherein the regulator further comprises a collar portion for engaging and sealing against an annular surface.

14. The regulator of claim 9, wherein the regulator is formed from a single piece of elastomer.

15. The regulator of claim 9, wherein the first outer wall and the second outer wall have a second state relative to one another when there is flow through the passage, and where there is a third maximum distance between the first and second outer walls that is less than the second maximum distance to reduce pressure of fluid exiting the regulator.

16. The regulator of claim 9, wherein the regulator is sized to seal inside a stem of a sprinkler.

17. The regulator of claim 9, wherein the regulator is sized to be disposed in a nozzle filter.

18. A method of compensating for pressure differences within a sprinkler using a regulator, the method comprising:

providing a regulator having an outer annular wall defining a flow passage for fluid flow through the regulator from an inlet and an outlet at either end of the flow passage, wherein the outer annular wall has a first portion interrupted by a plurality of slots, the plurality of slots defining at least a first outer wall and a second outer wall of the outer annular wall capable of moving relative to one another; and a second portion downstream of the first portion and downstream of the plurality of slots that is uninterrupted; and providing a first maximum distance between the first and second outer walls when there is no flow through the fluid flowing passage; and providing a second maximum distance between the first and second outer walls that is less than the first maximum distance, when there is fluid flowing through the flow passage, and wherein a pressure of fluid exiting the regulator at the outlet is less than a pressure of fluid entering the regulator at the inlet.

19. The regulator of claim 1, wherein the sprinkler comprises a filter that extends within the stem, and the regulator is disposed at least in part inside the filter so that a mesh of the filter surrounds the plurality of slots.

* * * * *